United States Patent [19]

Syveson

[11] 3,986,670

[45] Oct. 19, 1976

[54] HAND HELD THERMAL ELECTRIC FOGGING DEVICE

[75] Inventor: Chris D. Syveson, Emmetsburg, Iowa

[73] Assignee: Aero Industries, Inc., Emmetsburg, Iowa

[22] Filed: July 7, 1975

[21] Appl. No.: 593,888

[52] U.S. Cl. ............................ 239/133; 43/129; 239/136
[51] Int. Cl.² ........................................ B05B 1/24
[58] Field of Search ............... 239/133, 132, 136; 219/297, 301, 304, 311, 310, 272, 273, 275; 43/129; 222/146 HA, 146 HE

[56] References Cited
UNITED STATES PATENTS

| | | | |
|---|---|---|---|
| 3,069,092 | 12/1962 | Norvell, Jr. | 239/133 |
| 3,134,191 | 5/1964 | Davis | 239/133 X |
| 3,476,293 | 11/1969 | Marcoux | 219/301 |
| 3,496,668 | 2/1970 | Slater et al. | 43/129 |
| 3,675,360 | 7/1972 | Pierce | 43/129 |

Primary Examiner—John J. Love
Attorney, Agent, or Firm—Zarley, McKee, Thomte & Voorhees

[57] ABSTRACT

A hand held thermal electric fogging device is disclosed comprising a housing having a barrel-like connector provided thereon which is adapted to receive the valve means of an aerosol container containing the insecticide/oil solution. A plunger is movably mounted on the connector and is movable from a normal inoperative position to an operative position to open the valve means on the aerosol container so that the contents of the container are supplied to the discharge outlet of the connector. A tubular heat shield or manifold is connected to the housing and extends therefrom and has a coiled conduit positioned therein. The inlet end of the coiled conduit is connected to the outlet end of the connector so that the insecticide/oil solution is supplied to the interior of the conduit. A spray nozzle is provided on the discharge end of the conduit. An electrical heating means is positioned in the central area of the coil for heating the solution in the coiled conduit. A normally closed electrical switch means is provided on the housing for controlling the heating means. A lever is pivotally mounted on the housing and is selectively movable from a normal inoperative position to a first position wherein it closes the switch means to energize the heating means. The lever is also movable from the first position to a second position wherein the plunger in the connector is moved to its operative position so that the contents of the aerosol container are supplied to the coiled conduit which has been previously heated by the electrical heating means.

3 Claims, 7 Drawing Figures

HAND HELD THERMAL ELECTRIC FOGGING DEVICE

BACKGROUND OF THE INVENTION

Many types of sprayers and foggers have been provided to provide some means of spraying insecticide or the like. The main disadvantages of the prior art devices are that separate switches or control mechanisms are needed to control the electric heating elements and the valve means on the insecticide container. A further disadvantage of the prior art devices is that they are expensive to manufacture. A still further disadvantage of the prior art devices are that the units do not automatically go "off" when the unit is released from the operator's hand thereby creating a safety hazard. A still further disadvantage of the prior art devices is that efficient thermostats are not provided thereon to prevent overheating of the device.

Therefore, it is a principal object of the invention to provide a portable electrical thermal fogger which is safe to operate and requires few mechanical components.

A still further object of the invention is to provide a fogging device incorporating a single "deadman" control unit.

A still further object of the invention is to provide a fogging device which includes a thermostat to prevent overheating of the heating element.

A still further object of the invention is to provide a fogging device including insulation means for maintaining the heat adjacent the coiled conduit.

A still further object of the invention is to provide a fogging device which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 4:
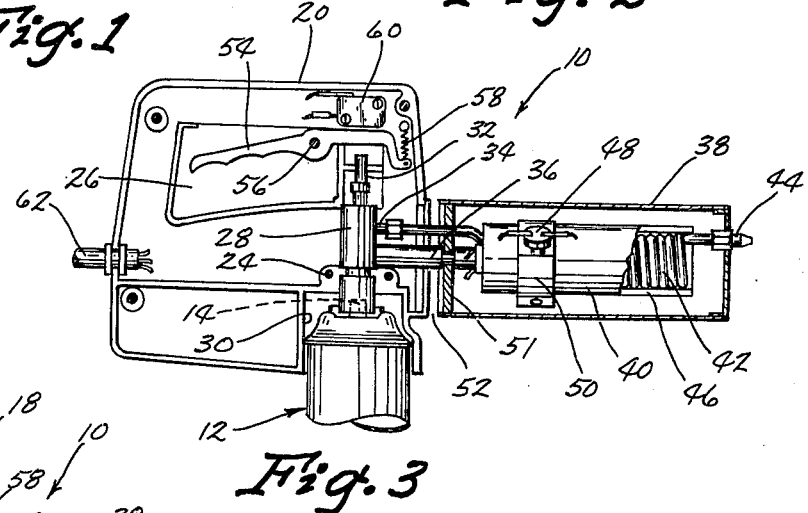
FIG. 4 is a fragmentary side view of the device with portions thereof broken away to more fully illustrate the invention.
Figure 6:
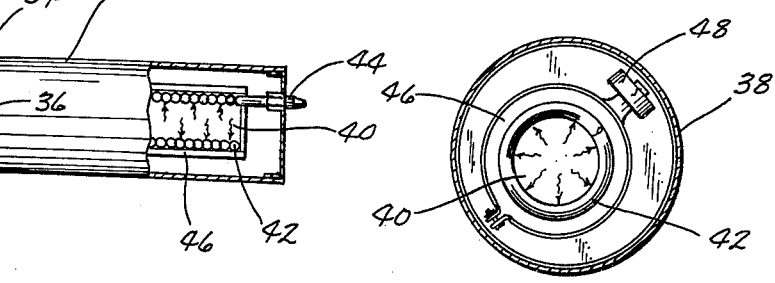
FIG. 6 is an enlarged sectional view seen on lines 6 — 6 of FIG. 5.

The fogging device is this invention is referred to generally by the reference numeral 10 while the numeral 12 refers to an aerosol container containing an insecticide/oil solution and having a conventional valve means 14 on the upper end thereof. The numeral 16 refers to a support plate adapted to be secured to the lower end of the container 12 to permit the device and the container to be stored in an upright condition. Device 10 generally comprises a housing 18 comprised of plastic housing members 20 and 22 secured together by bolts 24. The housing member 20 and 22 are formed as seen in FIG. 4 to provide an opening 26 as will be described in more detail hereinafter.

Figure 1:
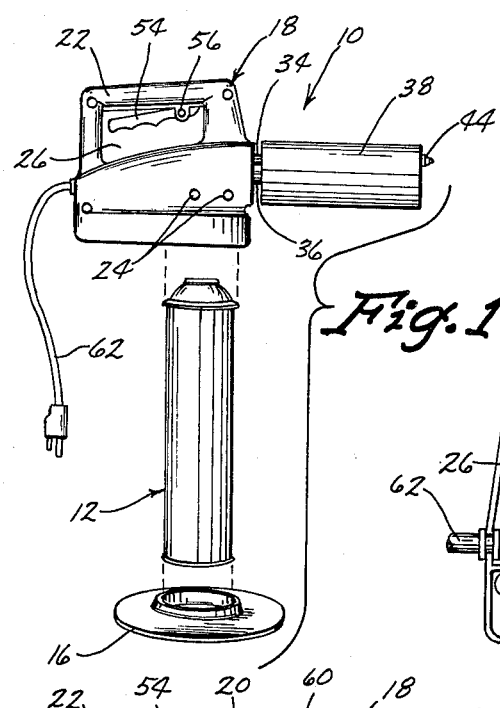
FIG. 1 is an exploded perspective view of the device.
Figure 3:
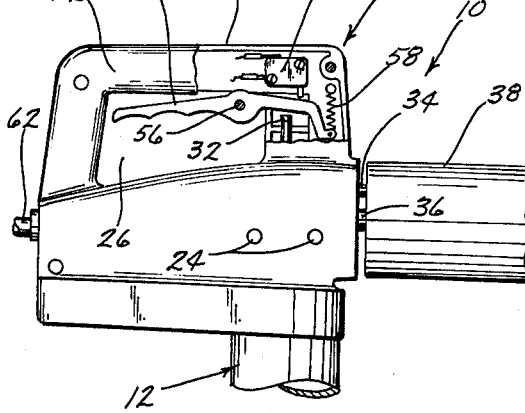
FIG. 3 is an enlarged partial sectional view seen on lines 3 — 3 of FIG. 2.

The numeral 28 refers to a barrel-like connector positioned in housing 18 adapted to receive the valve 14 of the container 12 as illustrated in FIG. 3. Housing 18 is also provided with a compartment area 30 formed in the lower end thereof which is adapted to frictionally receive the upper end of the aerosol can 12 to maintain the same therein. Plunger 32 is movably mounted in connector 28 and is normally in the upwardly extending position seen in FIG. 3 which is caused by the normally closing action of the valve 14. Connector 28 includes a discharge outlet 34 which is connected to an internal passageway formed therein which is in communication with the valve 14 of the container 12 so that the insecticide/oil solution will be supplied to the discharge outlet 34 when plunger 32 is depressed.

The numeral 36 refers to a support element secured to the housing and extending forwardly therefrom as illustrated in FIG. 3. The numeral 38 refers to a manifold or heat shield mounted on the outer end of element 36. Secured to the outer end of element 36 is an electrically energized ceramic heating cartridge generally referred to by the reference numeral 40. A coiled conduit or helical coil 42 is wrapped around the heating cartridge 40 as illustrated in FIGS. 3 and 4 and has a spray nozzle 44 provided at the discharge end thereof. The intake end of the coil 42 is connected to the discharge outlet 34 of connector 28. An asbestos insulating tube 46 embraces coil 42 which acts as a heat barrier between the coil assembly and the manifold 38 so that maximum retention of heat is provided adjacent the coil. The numeral 48 refers to a thermostat which is mounted on the tube 46 by clamp 50 and which is series connected to the heating cartridge 40 as will be described in more detail hereinafter. An insulating wafer 51 is positioned at the inner end of the manifold 38 and cooperates with the air gap 52 to provide a heat barrier between the heating element assembly and the plastic body of the unit.

Figure 7:
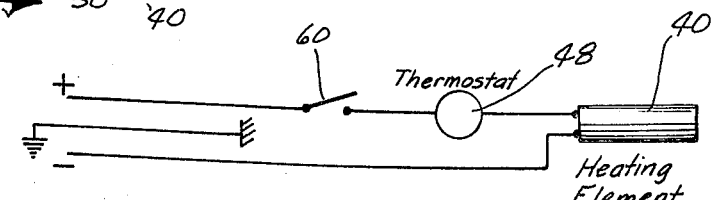
FIG. 7 is a schematic of the electrical circuitry of the invention.

A lever or handle 54 is pivotally mounted on the housing 18 at 56. Spring 58 normally maintains the lever 54 in an inoperative or "off" position. Switch 60 is also mounted in the housing 18 and is maintained in a normally open position by the lever 54. Switch 60 is series connected to the thermostat 48 and the heating element 40 as illustrated in FIG. 7. The numeral 62 refers generally to an extension cord or wiring harness comprising a three wire system with one wire grounding all metallic components on the device by a mechanical fastener on the connector 28.

Figure 5:
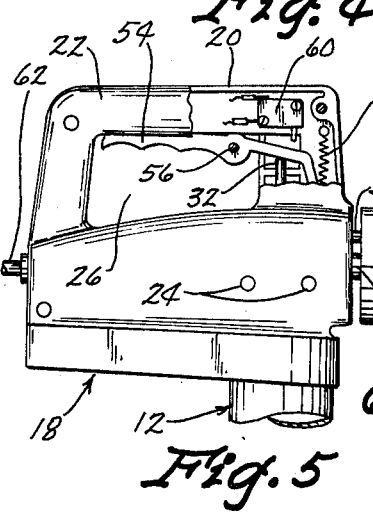
FIG. 5 is a view similar to FIG. 4 except that it illustrates the operating lever being completely depressed.
Figure 2:
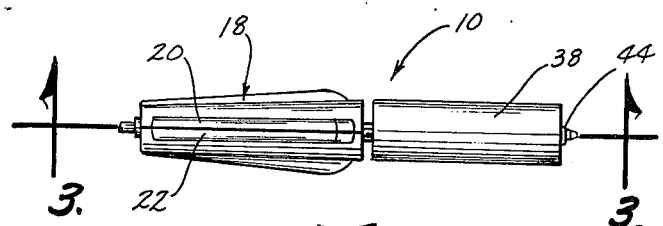
FIG. 2 is a top view of the device.

In operation, the canister 12 would be inserted into the compartment 30 so that the valve 14 is received by the lower end of the connector 28. If desired, the element 16 may be secured to the lower end of the container to permit the container to be stored in an upright condition. The extension cord 62 would then be connected to a suitable source of electrical energy. As previously stated, lever 54 is normally in the position illustrated in FIG. 3 which causes the switch 60 to be maintained in an open condition so that the heating element 40 is not energized. When it is desired to fog, lever 54 is moved from the position of FIG. 3 to the position of FIG. 4 so that switch 60 is able to move to its closed position. With switch 60 in the closed position, the heating element 40 becomes energized so that the coil 52 will be heated. After approximately two minutes has elapsed, lever 54 is moved from the position of FIG. 4 to the position of FIG. 5 so that the lever 54 engages the upper end of the plunger 32 to depress the same thereby opening the valve 14 to cause the insecticide/oil to be discharged from the canister or container 12 into the coil 42 as previously described. The insecticide/oil solution is under pressure and flows through the heated coil 42 and is vaporized therein and sprayed into the atmosphere through the spray nozzle 44.

Releasing the lever 54 causes the lever to return to the position of FIG. 3. The spring loaded aerosol can valve then returns the plunger 32 to the position of FIG. 3. The spring 58 causes the lever to be moved to the position of FIG. 3 which causes the switch 60 to be opened. In the position of FIG. 3, the unit is completely "off."

In the event that the operator should hold the actuating lever in the position of FIG. 4 for an excessively long time, without further depressing the lever to generate fog, the thermostat 48 will be activated to break the electrical circuit thereby preventing overheating. The thermostat will also be activated during fogging when the last of the can is being expelled and the insecticide/oil flow rate is low.

The device is designed so that if a malfunction occurs during fogging, the operator simply needs to release his grip on the handle or lever 54 so that all systems are automatically shut off. The thermostat 48 prevents overheating of the device so that damage is prevented thereto. The handle 54 is constructed of a plastic material as is the housing 18 so that the operator's hand does not contact any metallic parts. It is also important to note that the insulating sleeve 46 retains the heat adjacent the coil for maximum efficiency. Another important feature to be noted is that a single "deadman" lever is employed to control both the electrical power system and the insecticide/oil propellant system so that the system may be pre-heated prior to the insecticide/oil propellant being furnished to the coil 42.

Thus it can be seen that a device has been provided which accomplishes at least all of its stated objectives.

I claim:

1. A hand held thermal electric fogging device comprising:
    a housing,
    a connector mounted to said housing having discharge outlets and an inlet, said inlet being shaped to receive the valve means on an aerosol container;
    a plunger movably mounted in said connector and extending outwardly therefrom, said plunger being movable from an inoperative position to an operative position to open the valve means on the container so that the contents of said container are supplied to said discharge outlet through said inlet;
    an electrical heating cartridge operatively mounted on said housing;
    a coiled conduit wrapped around said heating cartridge in helical fashion, said conduit having an inlet and operatively connected to said discharge outlet of said connector and also having a discharge end;
    a spray nozzle on said discharge end of said conduit;
    an insulating tube made of heat insulative material surrounding said coiled conduit and said heating cartridge to maximize the heat retained adjacent said coil;
    a normally open electrical switch in said housing connected in series with a power source and said cartridge for controlling said cartridge;
    a thermostat in series with said cartridge and said power source for maintaining said cartridge below a predetermined maximum temperature;
    a lever pivotally mounted on said housing and being selectively movable from a normal inoperative position to a first position wherein said switch is closed to energize said cartridge and thence movable to a second position wherein it engages said plunger and moves said plunger to its operative position for introducing the contents of said container to said coiled conduit and outwardly through said spray nozzle;
    bias means urging said lever to its inoperative position;
    a tubular heat shield surrounding said insulating tube in spaced relation thereto; and
    means operatively mounting said heat shield to said housing.

2. The device of claim 1 wherein said tubular heat shield includes an inner end adjacent and spaced from said housing, an insulating wafer being provided over said inner end to prevent transfer of heat to said housing.

3. The device of claim 1 wherein said thermostat is located on the exterior of said insulating tube.

* * * * *